Figure 1:
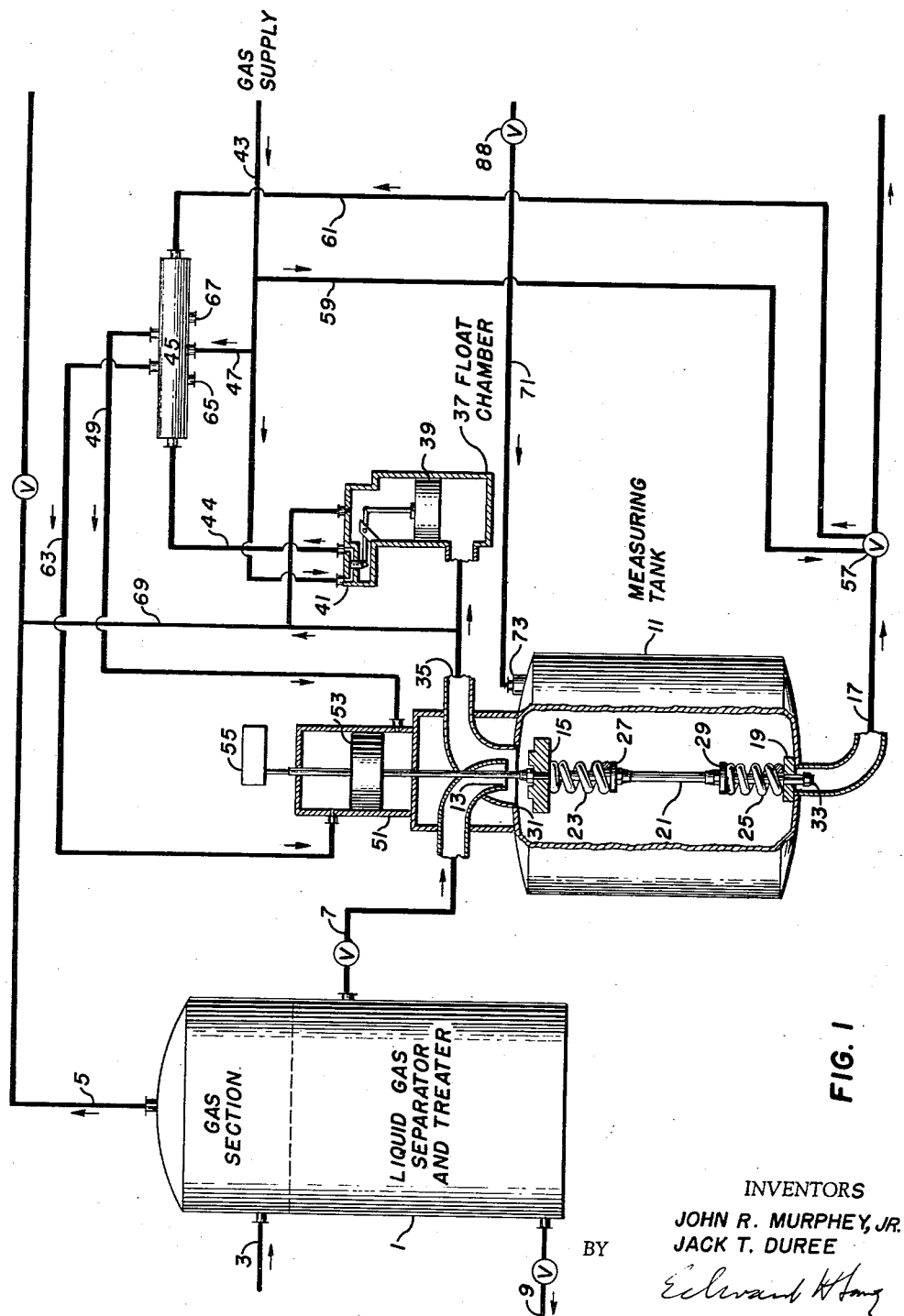

INVENTORS
JOHN R. MURPHEY, JR.
JACK T. DUREE
BY
ATTORNEY

March 3, 1964  J. R. MURPHEY, JR., ETAL  3,122,920
METERING DEVICE

Filed Aug. 16, 1957  2 Sheets-Sheet 2

INVENTORS
JOHN R. MURPHEY, JR.
JACK T. DUREE
BY

ATTORNEY

United States Patent Office 3,122,920
Patented Mar. 3, 1964

3,122,920
METERING DEVICE
John R. Murphey, Jr., and Jack T. Duree, Fort Worth, Tex., assignors to The Pure Oil Company, Chicago, Ill., a corporation of Ohio
Filed Aug. 16, 1957, Ser. No. 678,656
6 Claims. (Cl. 73—224)

This invention is directed to liquid volume meters and is particularly concerned with measuring vessels equipped with valves which automatically open and close when the measuring tank is full and empty, and which measuring tanks are equipped with gas pressuring means to assist in expelling liquid from the measuring tank.

In metering crude oil being produced it is the general practice to charge the oil from the producing wells into a gas separator and treating vessel in order to separate gas and any water therefrom. The separated oil is then charged from the separator and treating vessel into a metering tank equipped with a counter so that each time the inlet and outlet valves are operated for the tank the counter operates to count the number of tank-fulls of oil.

It is known practice in order to hasten the discharge of the oil from the measuring tank to impose gas pressure on the surface of the oil in the tank and force it more rapidly through the outlet line. Difficulty has been experienced with the equipment now in use for the reason that after discharge of the oil from the measuring tank and during the refilling operation when the outlet line from the measuring tank is closed and the gas pressuring line is closed, as it must be to prevent oil from flowing therethrough, a certain amount of gas becomes locked in the measuring tank and as the tank fills with oil the pressure of this gas increases and seeks a way to escape from the tank. This it does by passing through a float chamber which controls the measuring tank inlet valve. The gas escaping through the float chamber blocks the downward flow of oil and causes the float to act in the same manner that oil would during the filling cycle of the vessel, causing the float to close the measuring tank inlet valve and open the discharge valve before the tank is filled with oil. These false signals caused by the escaping gas under pressure result in inaccurate measurement because the tank is not full of oil at the time discharge begins.

Our invention resides in discovering the cause of faulty operation of metering tanks which are gas pressured and in devising a means for remedying this difficulty. We have discovered that if the line by means of which the metering tank is gas pressured during discharge is equipped with a valve located at the top of the metering chamber and this valve is made to remain open until the tank is substantially filled, the pressuring gas can escape through the gas pressuring line and avoid the difficulty which has heretofore been encountered.

Figure 2:
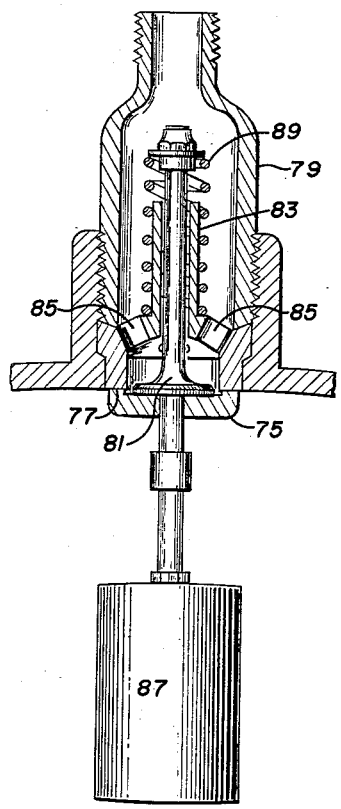
Figure 3:
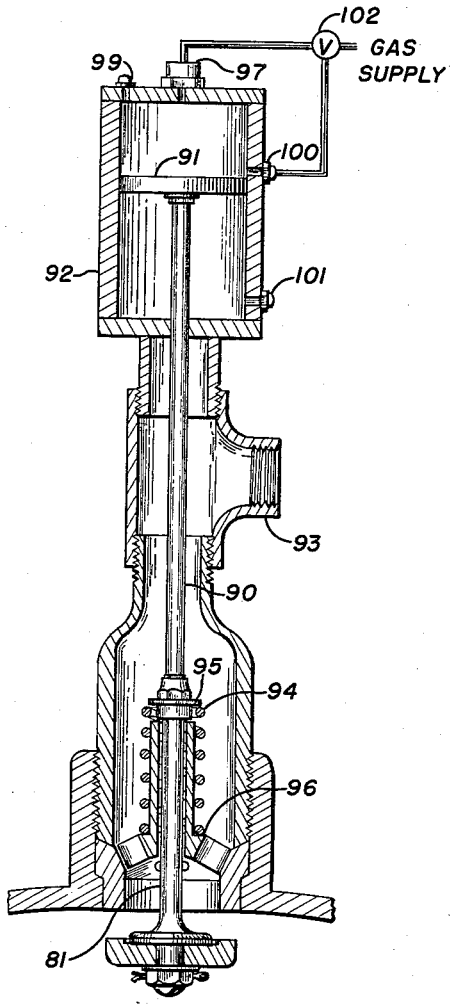
Figure 4:
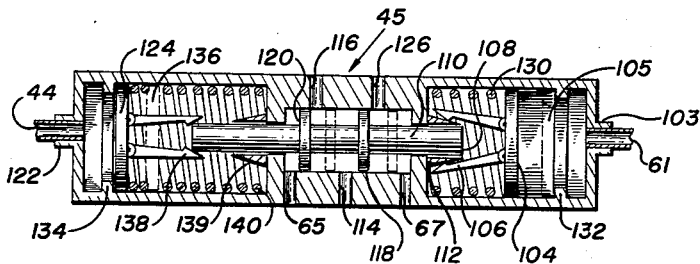

An object of the invention is to provide means for metering liquids. Another object of the invention is to provide a metering tank equipped with a valve-controlled gas line. A still further object of the invention is to provide a valve on a gas outlet line connected to a liquid metering tank, which valve will not close until the measuring tank is substantially full of liquid. A still further object of the invention is to provide a method for relieving gas pressure in a metering tank as the liquid level in the tank rises. Other objects of the invention will become manifest from the following description and accompanying drawing, of which FIGURE 1 is a diagrammatic, elevational view of apparatus in accordance with the invention; FIGURE 2 is an enlarged view partially in cross-section and partly diagrammatic of a valve forming part of our invention; FIGURE 3 is an enlarged cross-sectional view of another valve forming part of our invention; and FIGURE 4 is an enlarged cross-sectional view of a shuttle valve forming part of the novel apparatus.

Referring to FIGURE 1 of the drawing, the numeral 1 indicates a liquid-gas separator and treater having inlet 3, gas outlet 5, liquid outlet 7, and liquid outlet 9. Where the liquid to be metered is crude oil it is charged to the separator through line 3 to separate gas therefrom and the oil with any water content passes downward through the separator where it may be heated or given other treatment to separate water therefrom. Oil from which water and gas have been substantially completely or in large part removed is discharged from the gas separator through line 7 into the top of measuring tank 11 through inlet 13 controlled by valve 15. Measuring tank 11 is also equipped with a discharge conduit 17 controlled by outlet valve 19. The valves 15 and 19 are slideably mounted on rod 21 and are forced in the direction of their respective valve seats by means of coil springs 23 and 25, which are held under compression between the valves and collars 27 and 29, fastened to the rod 21. Rod 21 is formed with a member 31 adapted to exert downward pressure on the inlet valve 15 and hold it in open position when the rod is in a lowered position. The bottom of the rod 21 is formed with member 33, which is adapted to abut against the valve 19 when the rod is raised and hold the valve 19 in open position.

The top of the measuring tank 11 is connected by means of conduit 35 to a float chamber 37. The juncture of conduit 35 with the measuring tank is concentric with the inlet 13. Valve 15 is formed so that it opens and closes conduits 13 and 35 simultaneously. Located in float chamber 37 is float 39, mechanically connected by suitable linkage to a pilot valve 41 which permits gas to flow from gas supply 43 under pressure through line 44 to shuttle valve 45, shifting the shuttle valve to a position so that gas supply from line 43 will flow through lines 47 and 49 into the lower part of cylinder 51, mounted at the top of measuring tank 11. A piston 53 is slideably mounted in cylinder 51 and is rigidly mounted on the rod 21 which extends upwardly through the cylinder to operate suitable mechanism which in turn operates counter 55. Gas under pressure entering cylinder 51 through line 49 causes piston 53 to rise, with the result that element 31 is lifted from valve 15 permitting it to close conduits 13 and 35. Immediately after valve 15 is closed, the element 33 bears against valve 19, lifting it from its seat and permitting liquid to discharge from the measuring tank to discharge conduit 17. The float 39 opens the pilot valve 41 when measuring tank is full of oil and it passes up through conduit 35 into float chamber 37, causing the float to rise and open the pilot valve.

A suitable control device 57 is mounted in the discharge conduit 17. The control device 57 is preferably a float control device which controls the flow of gas from the supply line 43 through line 59 and line 61 to shuttle valve 45. When measuring tank 11 is empty and oil ceases to flow through the discharge conduit 17, flow control 57 opens and permits the gas from gas supply 43 to pass to shuttle valve 45 and open the passageway from line 47 to line 63 connected to the upper part of cylinder 51. The shifting of the shuttle valve 45 enables gas under pressure to enter cylinder 51 and force piston 53 downward. At the same time, it connects line 49 to exhaust port 65. As piston 53 moves downwardly it forces element 33 away from valve 19, permitting spring 25 to close the valve. Immediately thereafter, element 31 abuts against valve 15, forcing it into open position and allowing oil again to flow into the measuring tank. Just as exhaust port 65 opens when the shuttle valve is shifted to enable pressure gas to enter the upper part of cylinder 51 through line 63, port 67 is opened to permit gas from the upper part of cylinder 51 to escape through line 63 when the shuttle valve is shifted to the position to permit pressure gas to enter the lower part of the cylinder through line 49.

In order to equalize pressure between the gas separator, measuring tank, and the float chamber, gas equalization line 69 is connected between gas discharge line 5 at the top of separator, conduit 35 and the top of float chamber 37.

In order to accelerate discharge during discharge of liquid from the measuring tank 11, gas under pressure, i.e., from the separator 1, is injected into the top of the measuring tank through line 71 controlled by valve 73. This line ordinarily is connected to the gas section of treater 1 but may be connected to a separate source of supply. At the end of the discharge from the measuring tank this gas ordinarily becomes trapped in the tank 11 and as the tank again fills with oil or other liquid and as the gas becomes more and more compressed it seeks to escape from the tank. If no avenue of escape is provided it will surge upwardly through line 35 against oil which has been trapped in the float chamber. This surging action causes the float to rise and open pilot valve 41, setting in motion the mechanism for closing valve 15 and opening valve 19 while the tank is only partially filled with oil.

This surging action and malfunctioning of the float control is avoided by providing a valve 73 which remains open during substantially the entire period during which the tank is being filled and closes shortly before the tank is full. Suitable valves for effecting this purpose are shown in FIGURES 2 and 3.

In FIGURE 2, the valve element 75 closes against seat 77 formed at the bottom of the valve body 79. The valve is formed with stem 81 mounted in and adapted to slide in the cylinder 83 forming part of a spider with openings 85. The valve body 79 is mounted in a vertical position at the top of the metering tank 11. A float 87 is mounted axially with the stem 81 and is of sufficient weight to pull the valve element 75 to open position when the float is suspended in gas. As liquid rises in the tank and engages float 87 it gradually rises until the element 75 is seated in closed position against seat 77 so as to prevent flow of liquid through the line 71. It will be understood, of course, that if an independent source of gas is supplied to line 71, during filling of the tank the gas supply in line 71 is cut off so as to relieve the pressure in the metering tank. This can be accomplished by means of a three-way, two-position diverter motor valve 88 on line 71. Motor valve 88 can be turned to vent position upon receiving a signal from float control 57 after liquid has been completely evacuated from tank 11 and can be turned to gas inlet position upon receiving a signal from pilot valve 41 when the tank is filled and float 39 is in raised position. It will also be understood that the float 87 is properly weighted in order not to permit the valve to fully close until the tank is almost full. The buoyant force of the float is less than the differential pressure between the separator gas pressure and the pressure against which the metering tank discharges so that when valve 15 has closed and valve 19 has opened, gas forces the valve into open position against the closing force exerted upon the valve by the float and thus assists in purging the measuring tank. If desired, a coil spring 89 under compression may also be utilized, as in FIGURE 2.

A second form of valve which may be used is that shown in FIGURE 3. Instead of hanging a float onto the valve element, valve stem 81 is connected by a rod 90 to a piston 91 which in turn is slideably mounted in cylinder 92. The valve body is connected to the gas pressure line 71 through coupling 93. The valve is ordinarily maintained in closed position by coil spring 94 under compression between collar 95 and shoulder 96. A gas inlet 97 is provided at the upper end of the cylinder 92 in order to force the piston 91 downwardly and open the valve. A gas bleed 99 is also provided at the top of the cylinder in order to allow gas to escape slowly from the cylinder and relieve the pressure on piston 91. The gas bleed 99 is preferably adjustable so that it can be adjusted to slowly relieve the pressure at a rate so that the valve does not reach fully closed position until the measuring tank is substantially full. A relief vent 100 is provided in the side wall of the cylinder 92 so that the piston 91 cannot be forced beyond this point. Vent 100 is preferably connected to a shuttle or other type valve 102 which will cut off gas supply to inlet 97 when the piston 91 moves down past vent 100. Cylinder 92 is also provided with a second vent 101 near its lower end to vent air from beneath piston 91 and to release pressure on the shuttle valve to permit the valve element of valve 102 to return to open position. The gas supply for cylinder 92 may be obtained from the gas section of treater 1 or from a separate source. By pressuring the cylinder 92 at the beginning of the filling operation the valve will be maintained in open position and will gradually close, but will permit the gas to escape from the measuring tank through coupling 93. During the purging operation the pressure of the gas charged through coupling 93 is sufficient to open the valve against spring 94.

To explain more fully the sequence of operation, assume that float control 57 has sent a signal through line 61. The gas under pressure will enter port 103 (FIGURE 4) of the shuttle valve 45 and force piston 104 to move from position 105 to the position shown in the drawing. A pair of dogs 106 pivotally mounted on piston 104 bear against the end 108 of shaft 110 forcing it to move toward the left in the position shown in the drawing. When the dogs strike shoulders 112 they ride up on the shoulders. In the position shown in the drawing inlet port 114 connected to line 47 admits gas to the shuttle valve and permits it to pass through outlet port 116 through line 63 into the upper part of cylinder 51, thereby depressing piston 53, allowing valve 19 to close and forcing valve 15 to open position. The course of the gas through the shuttle valve is directed by the sealing members, or disks 118 and 120, rigidly mounted on shaft 110.

After the measuring tank is filled, float 39 is lifted, causing pilot valve 41 to open and admit supply gas through line 44 to port 122 of shuttle valve 45. This causes piston 124 to move toward the right and in turn forces shaft 110 toward the right so that the sealing disks assume the positions shown in dotted lines in the drawing, opening the passageway from inlet port 114 to outlet port 126 and closing the passageway from inlet port 114 to outlet port 116. This shift in position of the sealing disk also opens port 116 to exhaust port 65 so that the gas under pressure in the upper part of cylinder 51 can be exhausted to the atmosphere. At the same time gas from outlet port 126 passes through line 49 to the lower part of cylinder 51, causing the piston 53 to rise, allowing valve 15 to close and causing valve 19 to open. Until float chamber 37 is emptied of liquid, gas pressure from line 61 is maintained against piston 104 so that the piston remains in the position shown in the drawing. As the oil begins discharging from the measuring tank, float control 57 goes into a cocked position, relieving the pressure on the piston 104 and permitting the coil spring 130 to force the piston 104 in a righthanded direction back to the position indicated by the numeral 105, with the dogs 106 resting against the end 108 of the shaft ready for the next cycle. The righthand motion of piston 104 is limited by the stop collar 132 and the lefthand motion of piston 124 is limited by stop collar 134.

When the liquid has been completely evacuated from measuring tank 11 and gas passes flow control 57, the control changes position permitting gas from line 59 to pass to line 61 and to inlet port 103 to repeat the cycle just described. When the shaft 110 reaches the position shown in the drawing, gas exhausts from the bottom of cylinder 51 through exhaust port 67.

Piston 124 will remain in position shown by the numeral 136 with the dogs 138 riding on shoulders 139 until measuring tank 11 is completely evacuated and valve 15 is opened, permitting the liquid in float chamber 37 to evacuate and the float to close pilot valve 41 and relieving the pressure behind piston 124 and allowing coil spring 140 to force piston 124 to the position shown in the drawing.

We claim as our invention:

1. In a liquid meter comprising a measuring tank with a valve-controlled inlet at the top thereof and a valve-controlled outlet at the bottom thereof, connected to a gas-liquid separator by means of a liquid conduit extending from the bottom of said separator to said tank and a pressure-equalization conduit connecting the upper portion of said separator to the top of a float chamber mounted above said tank and in fluid communication therewith, a float in said chamber, means actuated by said float for opening the outlet valve and closing the inlet valve when said tank is filled with liquid, and means for closing the outlet valve and opening the inlet valve when said tank is empty, the improvement comprising a separate gas conduit connected to the top of said tank, a valve controlling said conduit and means for holding said valve in open position during filling of said tank and means for automatically effecting closure of said valve shortly before said tank is completely filled with liquid.

2. A meter in accordance with claim 1 in which the valve controlling said conduit is a poppet valve and the means for effecting closure of said valve is a coil spring surrounding the valve stem.

3. A meter in accordance with claim 2 in which the means for holding the poppet valve in open position during filling of the tank comprises a rod fastened to the stem of said poppet valve and in axial alignment therewith, a piston mounted on said rod and slideably mounted in a cylinder, a gas inlet at the end of the cylinder remote from said valve, a gas bleed on the same end of said cylinder and a gas escape vent intermediate the ends of said cylinder, a gas conduit connected to said gas inlet, a valve in said conduit normally in open position, means actuated by gas escaping from the aforesaid vent for closing said valve, and a second gas vent in the end of said cylinder opposite to the gas inlet end.

4. A meter in accordance with claim 1 in which the valve controlling said conduit is a poppet valve which opens in a substantially vertical downward direction, the means for holding the valve in open position includes a float secured to the movable member of said valve and extending substantially vertically from the valve into the upper part of said tank, and the means for effecting closure of said valve is said float.

5. A meter in accordance with claim 4 in which the means for effecting closure of said valve includes a coil spring bearing against the movable element of said valve.

6. A liquid meter comprising a chamber, a fluid conduit connected to the upper end of said chamber, a fluid outlet connected to the bottom of said chamber in substantially axial alignment with said first mentioned conduit, a rod slideably mounted in said chamber in substantially axial alignment with said conduit, valve elements mounted on said rod in positions inside said chamber to open and close said fluid outlet and to simultaneously therewith open and close said fluid conduit, intermittent motion imparting means connected to said rod to actuate said rod when said chamber is completely filled and when said chamber is completely empty, means mounted on said rod to retain the valve element for said fluid outlet in closed position while valve element for said fluid conduit is retained in open position, and vice versa, counting means connected to said rod, a separate conduit connected to the top of said chamber, a poppet valve which opens in a substantially vertical direction controlling said conduit, and a float secured to a movable member of said poppet valve and extending substantially vertically from the valve into the upper part of said chamber, whereby said valve is held normally open and is automatically closed after said chamber is almost completely filled with liquid.

References Cited in the file of this patent

UNITED STATES PATENTS

| 826,221 | Blessing | July 17, 1906 |
| 966,270 | Van Leir | Aug. 2, 1910 |
| 1,114,360 | Hornung | Oct. 20, 1914 |
| 1,538,214 | Rath | May 19, 1925 |
| 2,158,381 | Raymond | May 16, 1936 |
| 2,211,282 | McKeever | Aug. 13, 1940 |
| 2,251,086 | Van Dyke et al. | July 29, 1941 |
| 2,872,817 | Pitts | Feb. 10, 1959 |
| 2,876,641 | Brown | Mar. 10, 1959 |

FOREIGN PATENTS

| 394,877 | Germany | Mar. 8, 1923 |

OTHER REFERENCES

Phillip's Proposal in an article entitled, "Automatic Custody Transfer in Texas," in the Oil and Gas Journal, July 30, 1956, vol. 54, No. 48, pages 122, 123.